United States Patent [19]

Vukosavic

[11] Patent Number: 4,912,378
[45] Date of Patent: Mar. 27, 1990

[54] THIRD HARMONIC COMMUTATION CONTROL SYSTEM AND METHOD

[75] Inventor: Slobodan N. Vukosavic, Beograd, Yugoslavia

[73] Assignee: Emerson Electric Co., St. Louis, Mo.

[21] Appl. No.: 222,556

[22] Filed: Jul. 21, 1988

[51] Int. Cl.⁴ .......................................... H02K 29/06
[52] U.S. Cl. .................................. 318/254; 318/138
[58] Field of Search ....................... 318/138, 254, 439

[56] References Cited

U.S. PATENT DOCUMENTS 4,641,066  2/1987  Nagata et al. ................... 318/138 X
4,743,815  5/1988  Gee et al. ............................ 318/254

Primary Examiner—Bentsu Ro
Attorney, Agent, or Firm—Polster, Polster and Lucchesi

[57] ABSTRACT

A system for determining rotor position information from the back emf of a permanent magnet motor includes extracting the third harmonic from the back emf of the motor by summing the terminal voltages of the motor. The phase angle of the third harmonic of the back emf is a function of the position of the rotor, and a signal is produced when the phase angle of the third harmonic (measured with respect to the voltage on the neutral conductor of the motor) reaches a predetermined angle. Electronically controlled switches selectively apply power to the phase windings of the motor in response to the detection of predetermined phase angles of the third harmonic.

13 Claims, 5 Drawing Sheets

THIRD HARMONIC COMMUTATION CONTROL SYSTEM AND METHOD

BACKGROUND OF THE INVENTION

This invention relates generally to the field of permanent magnet motors and more particularly to such motors which sense rotor position using back EMF.

According to Faraday's law when a time-varying magnetic flux "phi" interacts with a coil of wire having "N" turns, an electromotive force (EMF or voltage) is produced which is equal to the time rate of change of the magnetic flux times the number of turns. The polarity of this induced voltage tends to oppose current flow in an energized motor winding: hence the term "back" EMF.

In a permanent magnet motor, the source of the magnetic flux "phi" is a set of permanent magnets mounted on the rotor of the motor. The faster the motor turns, the faster the magnetic field changes relative to the stator windings of the motor, thus creating a larger back EMF. This back EMF can be used to provide position information of the rotor with respect to the stator in order to allow brushless commutation of the permanent magnet motor.

Numerous systems in the past have used back EMF commutation techniques. Early systems of this type were primarily unipolar and linked the back EMF directly or semi-directly to the switching devices so that commutation of the various phases of the motor was a direct result of the back EMF measured for the various phases. More complex systems have subsequently been designed, with a correspondingly high parts count. For example, some systems integrate the back EMF signal to obtain position information.

Still other systems have used passive filters to determine the commutation point after a zero crossing of the back EMF is sensed. These latter systems do have the advantage of being simple and requiring low-cost hardware, but their advance angle is not adjustable, but rather varies inherently with speed.

Back EMF systems heretofore have also suffered from noise in the back EMF signal. This noise adds error to the position signal generated by these systems, which error can be objectionable.

In addition to the back EMF systems outlined above, other brushless commutation systems have used Hall or optical sensors for position feedback. Such sensors, however, add hardware cost and occasionally suffer from reliability problems due to the harsh environment in which the sensors must often operate.

U.S. Pat. No. 4,743,815 to Gee et al addresses many of the above concerns, yet even the system shown in Gee et al could be improved for certain applications. In Gee et al the zero crossing of the back EMF of each phase is sensed to provide position information. In certain high torque or high current conditions, the system of Gee et al could suffer loss of position information because the zero crossing of the open phase was blanked out (i.e., not detected) by the system during commutation.

SUMMARY OF THE INVENTION

Among the various objects and features of the present invention may be noted the provision of a brushless permanent magnet motor commutation system which provides robust and reliable information on rotor position.

Another object of the present invention is the provision of such a system which reduces the effect of noise on the rotor position signal.

A third object of the present invention is the provision of such a system which automatically provides the necessary phase shift of the zero crossing signal so that additional delay circuitry is not required.

A fourth object of the present invention is the provision of such a system which eliminates the need to integrate the back EMF signal.

A fifth object of the present invention is the provision of such a system which allows simple and effective adjustment of the commutation advance angle.

Other objects and features will be in part apparent and in part be pointed out hereinafter.

A system of the present invention for determining rotor position information from the back EMF of a brushless permanent magnet motor includes circuitry for extracting the third harmonic from the back EMF of the permanent magnet motor. The motor has stator phase windings and a rotor for rotation with respect to the phase windings and the back EMF has at least a fundamental component and a third harmonic. The system also includes circuitry for detecting the phase angle of the third harmonic of the back EMF, which phase angle is a function of the position of the rotor, and circuitry responsive to the phase angle detecting circuitry for signaling the occurrence of a predetermined phase angle of the third harmonic.

A commutation system of the present invention for electronically commutating phase windings of a brushless permanent magnet motor includes circuitry for sensing the back EMF of the motor. The motor has a rotor for rotation with respect to the phase windings and the back EMF has at least a fundamental component and a third harmonic. The back EMF is generated by rotation of the rotor with respect to the phase windings. The system also includes circuitry for extracting the third harmonic from the back EMF of the motor and circuitry for detecting the phase angle of the third harmonic of the back EMF, which phase angle is a function of the rotational position of the rotor. Electronically controlled switches selectively apply power to the phase windings of the motor, the switches being responsive to a set of control signals. The system also includes circuitry for generating the control signals in response to the detection of predetermined phase angles of the third harmonic by the phase angle detecting circuitry.

A method of the present invention of electronically commutating the phase windings of a brushless permanent magnet motor includes the steps of sensing the back EMF of the motor, the back EMF having at least a fundamental component and a third harmonic, detecting the phase angle of the third harmonic of the back EMF, the phase angle being a function of the rotational position of the rotor, and selectively applying power to the phase windings of the motor in response to the detection of predetermined phase angles of the third harmonic.

BRIEF DESCRIPTION OF THE DRAWINGS

Similar reference characters indicate similar parts throughout the several views of the drawings.

DESCRIPTION OF THE PREFERRED EMBODIMENTS

Figure 1:
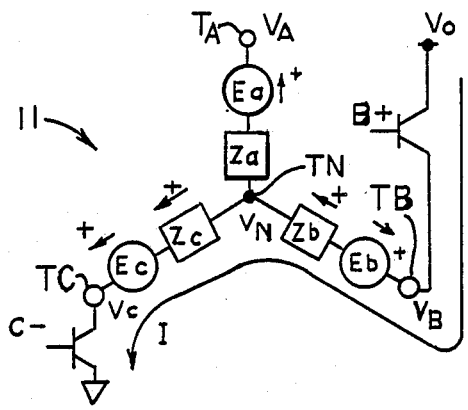
FIG. 1 is an electrical schematic of a three phase brushless permanent magnet motor illustrating the various voltages occurring when the A-phase is the open phase.

A brushless permanent magnet motor 11 (FIG. 1) includes three phases A, B, and C represented in FIG. 1 by their respective impedances Za, Zb, and Zc. Motor 11 is shown with the supply voltage Vo supplied by means of a pair of transistors B+ and C− across the B and C phases of motor 11 so that current I flows through those phases. This leaves the A-phase open. As shown in FIG. 1, each phase has a back EMF Ea, Eb, and Ec, associated therewith due to the rotation of the permanent magnet rotor (not shown) of motor 11. The motor has terminals TA, TB and TC for each phase, the terminal voltage for each phase being labeled VA, VB, and VC, respectively.

Assuming that the back EMF is symmetrical and that the winding impedances of the three phases are matched, it can be shown, as is well known, that absent a back EMF in the open phase the terminal voltage of that phase would equal the voltage VN at the neutral point independently of load current. Subtracting the voltage VN from the open phase terminal voltage thus gives a voltage which is the back EMF for that phase. Such plots are well known, and different means have been applied in the past to obtain the back EMF of the open house. An ideal back EMF plot (FIG. 2) shows the trapezoidal back EMF characteristic of each phase and reflects the fact that the various phases are commutated on every 120 electrical degrees.

Figure 2:
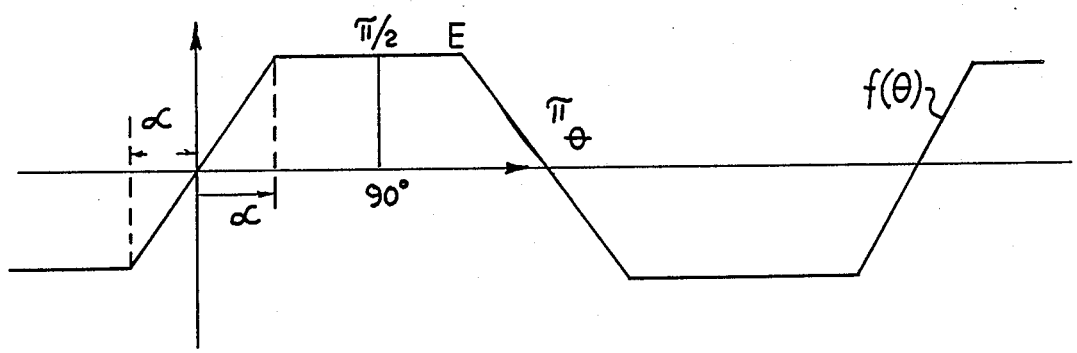
FIG. 2 is a graphical representation of the ideal back EMF voltage of any one of the three phases in the three phase motor of FIG. 1 based on 120 degrees of conduction for each phase.

As shown in FIG. 2, the back EMF rises from its negative-most excursion to zero and from zero to its positive-most excursion in an angle of "alpha" degrees, "alpha" typically being thirty degrees. An examination of the plot of FIG. 2 reveals that the back EMF plot is what is known in mathematics as an odd function. This means that the waveform shown in FIG. 2 can be represented as a series of sine waves of certain predetermined frequencies and amplitudes. More particularly, the waveform (labelled f(θ) in FIG. 2) can be defined as follows:

$$f(\theta) = \sum_{n=1}^{\infty} b_{2n-1} \sin((2n-1)\theta)$$

where $b_{2n-1} = \dfrac{4E * \sin((2n-1)\alpha)}{\pi(2n-1)^2 \alpha}$.

In this equation, E is a constant and "n" is an integer.

From an examination of the equation for $b_{2n-1}$, it can be seen that the waveform f(θ) includes, besides the fundamental component, the odd harmonics, namely the third harmonic, the fifth harmonic, the seventh harmonic, and so on. Further examination reveals that the amplitudes of these harmonics decrease rapidly with the higher harmonics. For example, by substituting in values for "n" and assuming that alpha equals thirty degrees, it is readily found that the amplitudes of the harmonics are the following percentage of the amplitude of the fundamental:

| Harmonic | Percentage of Fundamental |
|---|---|
| Third | 22 |
| Fifth | 4 |
| Seventh | 2 |
| Ninth | 2 |
| Eleventh | 1 |
| Thirteenth | 0.6 |
| Fifteenth | 0.9 |
| Seventeenth | 0.3 |

Because the third harmonic is much greater than any of the other harmonics, the terminal voltages can be satisfactorily approximated by the following equations:

$V_A = V_1 \sin \theta + 0.22 \, V_1 \sin 3\theta$ $V_B = V_1 \sin(\theta + 120°) + 0.22 \, V_1 \sin 3(\theta + 120°)$ $V_C = V_1 \sin(\theta + 240°) + 0.22 \, V_1 \sin 3(\theta + 240°)$ where $V_1$ is a constant.

If these terminal voltages are summed together, the fundamental component drops out (assuming balanced windings and balanced applied voltages) leaving only the third harmonic. In fact, summing the terminal voltages cancels out the fifth, seventh, eleventh, and thirteenth harmonics as well, leaving only the third harmonic, the ninth harmonic, and the fifteenth harmonic among those listed above. But of these only the third harmonic is significant in amplitude, so a summing of the terminal voltages results in an effective extraction of the third harmonic from the terminal voltages.

The summed terminal voltages, which is the third harmonic, equals sixty-six percent of the fundamental, so its amplitude is certainly sufficiently high to be detected. This third harmonic, since it is created by rotation of the rotor of the motor with respect to the phase windings, contains the desired information about rotor position for commutation.

An analysis similar to that set forth above reveals that the voltage applied by the commutation system to the various phases, unlike the back EMF, does not contain a third harmonic component. As a result, the third harmonic extracted by the summing procedure set forth above is purely a function of rotor position and is not a function of the applied voltage. This conclusion has been verified by using the summed terminal voltage as a position indicating signal in a system such as that shown in U.S. Pat. No. 4,743,815 to Gee et al. Inasmuch as the present invention is usable in the Gee et al system, the entire disclosure of the Gee et al patent is incorporated herein by reference.

In the Gee et al system (shown in FIG. 3), motor 11 has its terminals connected to a dc power source through an inverter output stage 13. The dc power source in this embodiment is an SCR/diode input stage 15 connected to a suitable ac line input. As is known in the art, by controlling the phase at which a pair of SCRs 17 are turned on, the ac voltage from the ac line can be converted to a dc voltage on a capacitor Cl. This dc voltage is applied to the desired pairs of phase windings A through C by means of six switching circuits A+, B+, C+, A−, B−, and C− in the conventional maner. Each switching device A+ through C− consists of an IGBT transistor in parallel with a diode, although similar switching devices could be used. When switching device A+ and switching device B− are both "on", current from the dc suply flows through the switching device A+, through winding A, then winding B, and finally through switching device B− back to the negative side of the dc source. The other switching devices operate in the same manner to commutate motor 11. In returning to the negative side of the dc source, the motor current flows through a current sensing resistor R1 so that the system of FIG. 3 may change the commutation as a function of motor current if desired.

Figure 3:
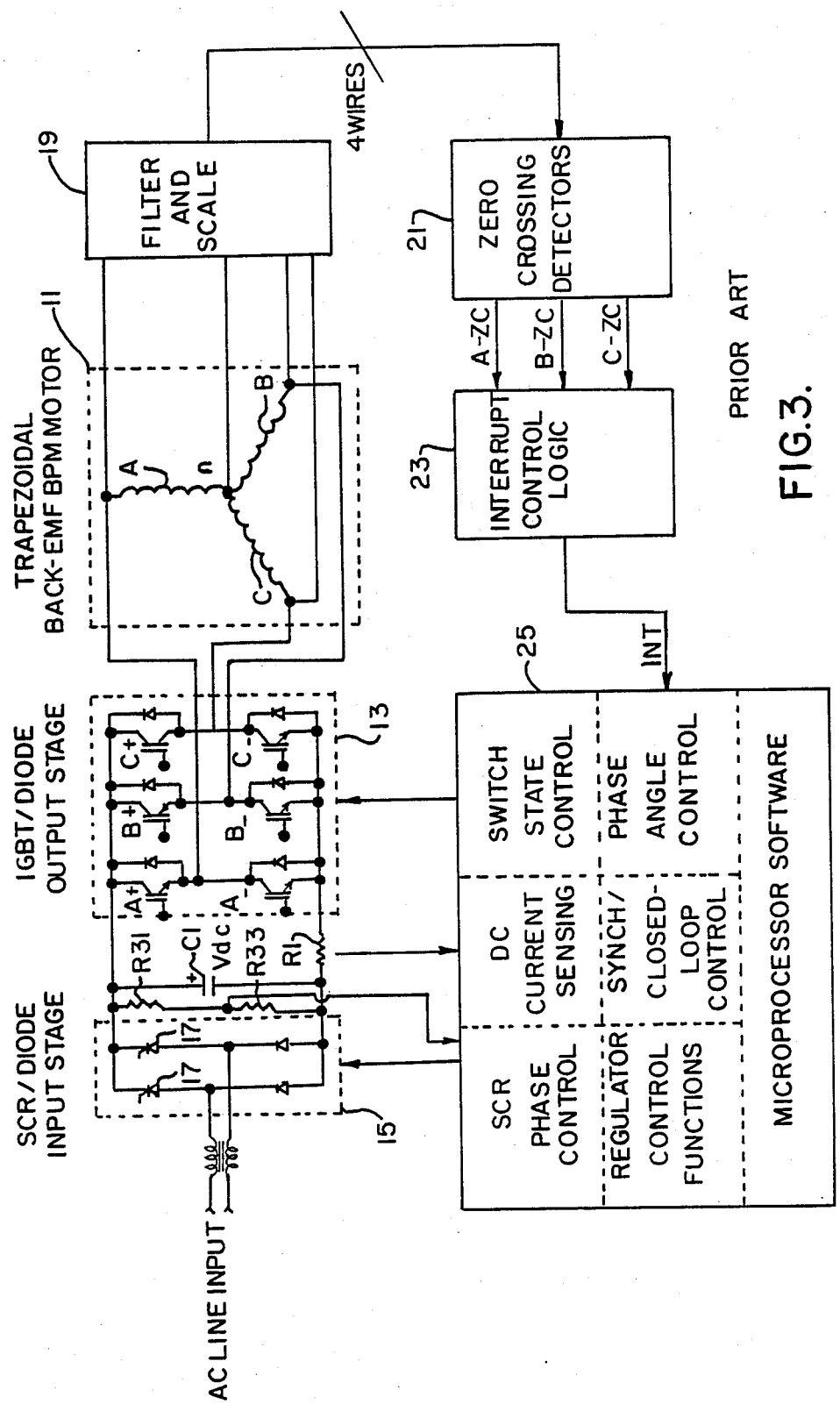
FIG. 3 is a block diagrammatic representation of the brushless permanent magnet motor system of the aforementioned U.S. Pat. No. 4,743,815 to Gee et al.

The motor terminals of motor 11 in the Gee et al system are also connected through a filter and scale circuit 19 whose only purpose is to lower the measured voltages on the terminals to a level compatible with the electronic components used in the remainder of the system of FIG. 3. Note that the neutral point N of motor 11 is also connected by a neutral wire to filter and scale circuit 19. Once the signal from the motor terminals have been filtered and scaled by circuit 19, the filtered and scaled signals of Gee et al are supplied to zero crossing detectors 21. These zero crossing detectors detect the zero crossing point ZR for each of the three phases. Signals from the zero crossing detectors are then supplied to interrupt control logic 23, which analyzes the signals to determine when the desired zero crossings have occurred. Once a desired zero crossing has occurred, the interrupt control logic 23 sends an interrupt signal to a microcomputer or microprocessor 25. Microprocessor 25 is responsible for responding to the interrupt signal to commutate the switching devices of output stage 13 at the proper time to commutate motor 11. In so doing, it controls the phase angle of the commutation.

Microprocessor 25 is also responsible in the Gee et al system for controlling the phases of SCRs 17 to provide the proper dc voltage. In addition it senses the dc current through resistor R1. It also switches between open loop operation of motor 11 during starting to closed-loop control of the motor during operation.

Figure 4:
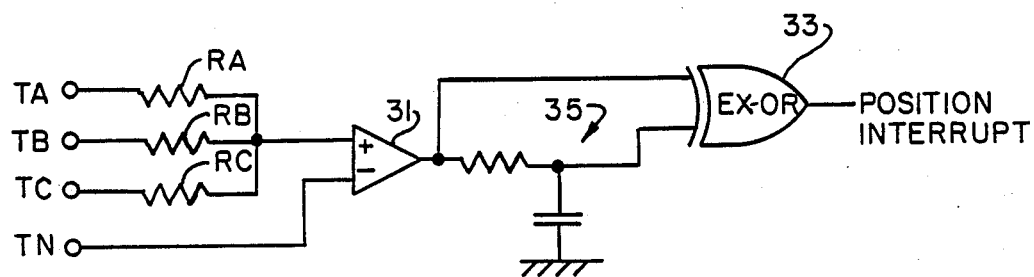
FIG. 4 is an electrical schematic of one embodiment of back EMF position detection circuitry usable with the system of FIG. 3.

Turning to the present invention, instead of using the separate zero crossing detectors for each phase as taught by Gee et al, the circuit of FIG. 4 is used to sum the terminal voltages as set forth above and provide the interrupt signals for the microprocessor controller of the Gee et al patent.

In the circuit of FIG. 4, three summing resistors RA, RB and RC are connected between their respective motor terinals TA, TB and TC on the one hand and the non-inverting input of an operational amplifier (op amp) 31 on the other. The neutral conductor voltage $V_N$ is also supplied via a motor terminal TN to the inverting input of op amp 31 so that the output of op amp 31 is a function of the summed terminal voltages of the three phases referenced to the voltage $V_N$ on the neutral conductor of the motor.

More particularly, the output of op amp 31 swings to its positive supply voltage whenever the summed terminal voltage is greater than the neutral conductor voltage and swings to its negative supply voltage whenever the summed terminal voltage is less than the neutral conductor voltage. The output of op amp 31 is thus the mathematical function called the "signum" of the summed terminal voltages referenced to the neutral conductor voltage. The output of the op amp is supplied directly to one input of an exclusive-OR gate 33 and indirectly through a low-pass filter 35 to the other input of gate 33 so that the output of gate 33 is suitably shaped interrupt signal for microprocessor 25.

The position interrupts of the circuit of FIG. 4 occur at the zero crossings of the summed terminal voltages. Contrast this with previous systems which were responsive to zero crossings of the open-phase voltage alone.

Figure 5:
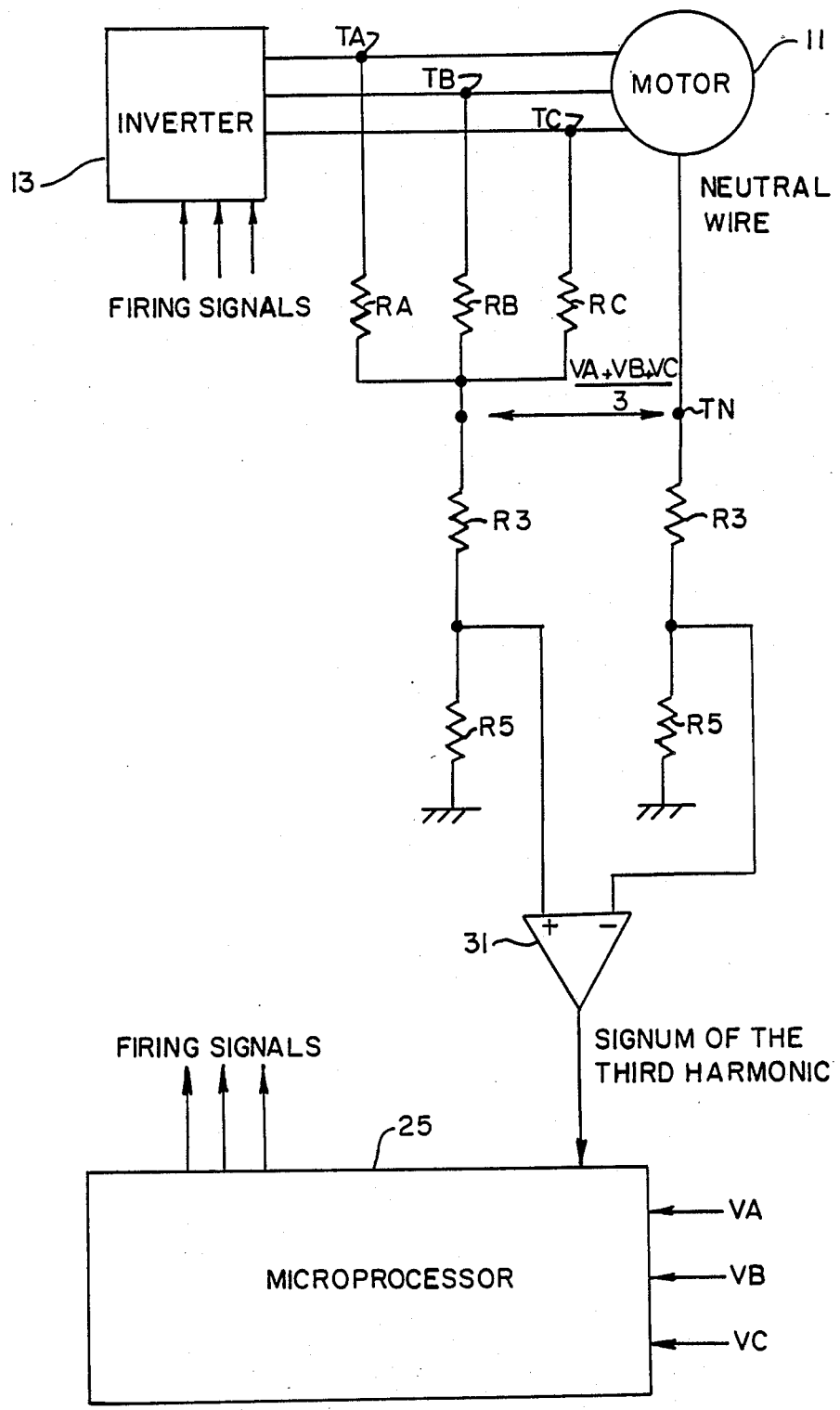
FIG. 5 is an electrical schematic of a system similar to that of FIG. 3 constructed in accordance with the present invention.

The commutation system of the present invention using a circuit similar to that of FIG. 4 is shown in FIG. 5. In the circuit of FIG. 5 a set of step-down resistors R3 and R5 are used to step down the voltage inputs to op amp 31. The output of op amp 31 is supplied to microprocessor 25 which obtains rotor position information therefrom. The microprocessor also receives as inputs signals representing the terminal voltages of the various phases for the purpose of calculating speed and load of the motor. From this information it calculates the desired advance angle for the motor and generates corresponding firing signals for commutating the motor by controlling inverter 13 in the conventional manner.

In the above analysis, it has been assumed that the summed terminal voltages contain no fundamental component. In practice, however, there can be some fundamental component present since the motor can be asymmetrical, the number of turns in various phases can differ, or the magnetization profile of the rotor can vary. These and other factors may in some instances require a more robust method for extracting the third harmonic from the terminal voltages. One common method of improving the robustness of control in prior systems is to integrate the sensed voltages. This approach does not work with respect to the present position detection system, however, since it results in the noise (i.e., the fundamental component of the back EMF) being emphasized three times with respect to the signal (namely, the third harmonic). Integration using the present position detection scheme severely distorts the position information and in extreme cases causes it to be lost entirely.

In addition to the factors listed above, the use of wide-tolerance resistors and large-offset operational amplifiers can increase this asymmetry. The presence of the ninth harmonic in the summed terminal voltage signal also could affect the results in exceptionally demanding applications.

Figure 6:
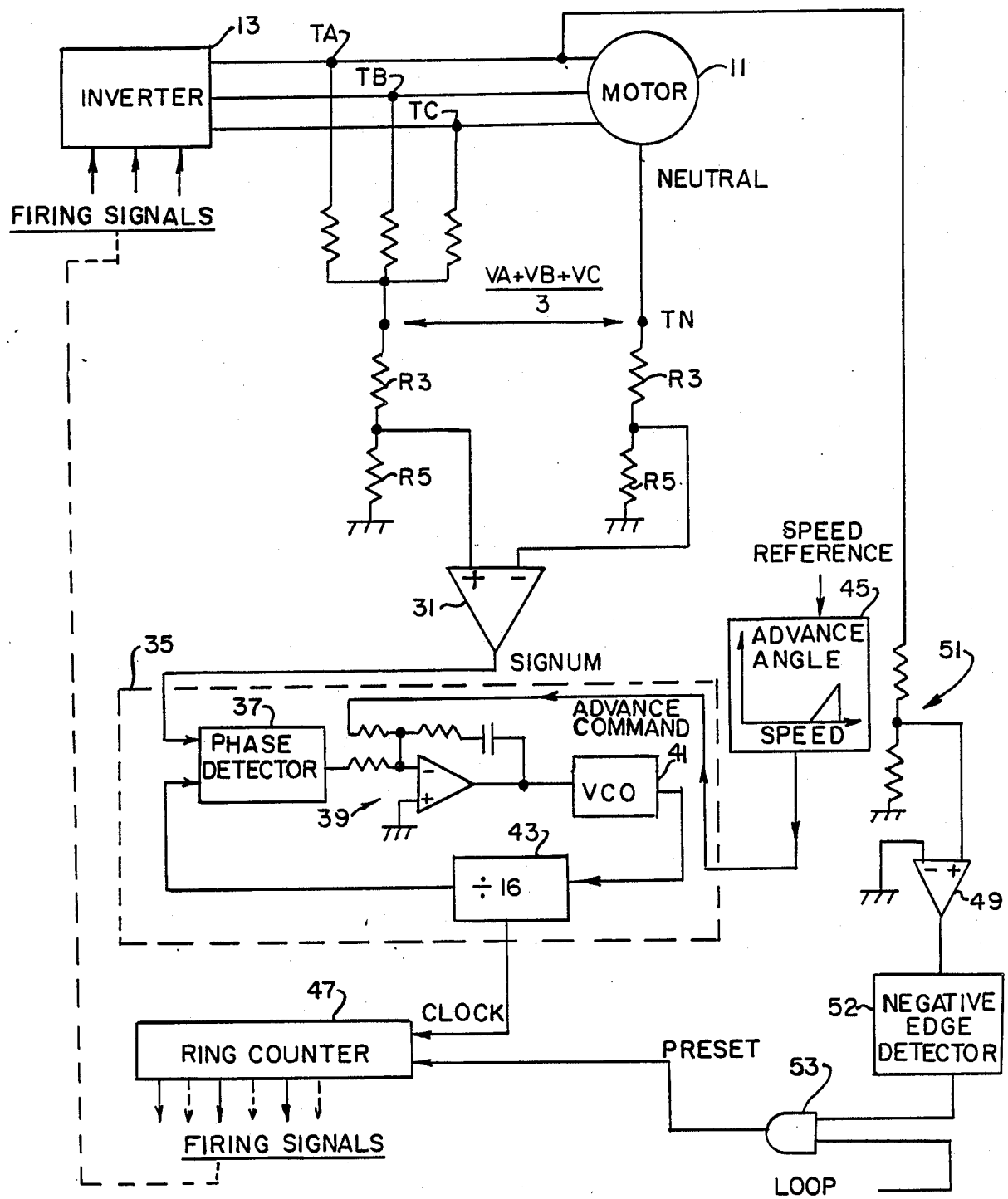
FIG. 6 is an electrical schematic illustrating an alternative embodiment of the system of the present invention.

For those instances where a more robust scheme is required for extraction of the third harmonic, the system of FIG. 6 may be used. In the system of FIG. 6, the output of op amp 31 is supplied to the input of a phase locked loop 35. Loop 35 includes a phase detector 37, a loop filter 39, a voltage controlled oscillator (vco) 41, and a divide-by-sixteen counter 43. Phase detector 37 and vco 41 are commonly incorporated into a signal integrated circuit chip such as a 4046-type CMOS chip.

In addition to standard loop features, loop 35 also provides the ability to adjust the advance angle of motor 11. This aim is accomplished by providing a biassing input to loop filter 39, which input is labelled "Advance Command" in FIG. 6. This advance command is an analog signal generated by suitable control circuitry 45 of conventional construction. Control circuitry 45, which can include microprocessor 25, has as its input motor speed information. In response to the motor speed the control circuitry computes the desired advance angle for that speed and supplied an analog biassing signal representing that speed to the loop filter 39.

The output of the phase locked loop is taken from divide-by-sixteen counter 43. That output is supplied to the clock input of a ring counter 47, whose output in turn are the firing signals for inverter 13.

Control of the firing signals by phase locked loop 35 is a closed loop mode of control. This mode works well once a certain minimum speed, such as one-tenth of full speed is reached by the motor. During starting, however, open loop control is preferred.

During starting, voltage information from a single phase is sensed by an op amp 49 that receives that information by way of a set 51 of step-down resistors. The output of op amp 49 is the signum of its input signal, referenced to ground. This output is supplied to a negative edge detector 52 whose output is supplied to an AND gate 53. The other input to AND gate 53 is a Loop Mode Command signal, generated by the microprocessor for example. During starting the Loop Mode Command signal lets the output of negative edge detector 52 reach the preset input of ring counter 47 to cause the ring counter to generate firing signals in response to the output of the negative edge detector.

Once the motor reaches a predetermined speed, such as ten percent of full speed, the Loop Mode Command signal is changed to block the output of the negative edge detector from reaching the ring counter and to allow the phase locked loop to assume control of commutation.

Figure 6A:
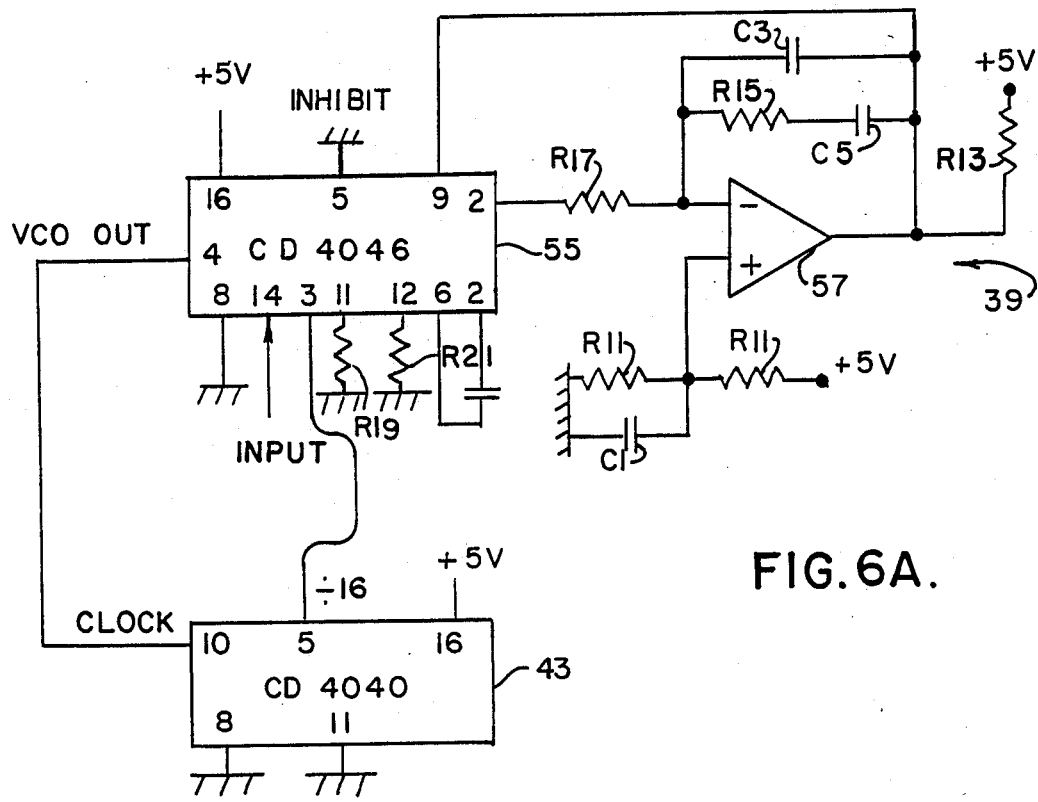
FIG. 6A is a block diagram illustrating a particular implementation of a portion of the system of FIG. 6.

An implementation of phase locked loop 35 is illustrated in FIG. 6A. In this implementation the phase detector and the vco are part of a 4046-type chip 55. Loop filter 39 in this implementation includes an op amp 57 with its non-inverting input connected between a pair of 10K resistors R11 which in turn are connected between +5 V and ground. A 0.1 micro-F capacitor C1 is also connected between the non-inverting input of op amp 57 and ground.

The output of op amp 57 is connected to pin 9, the vco-in pin, of chip 55. It is also connected through a resistor R13 to the +5 V source. In the feedback loop of op amp 57 (between its output and the inverting input) is a 0.01 micro-F capacitor C3 in parallel with the series combination of a 33K resistor R15 and a 0.1 micro-F capacitor C5. The inverting input of op amp 57 is also connected through a 68K resistor R17 to pin 2 of chip 55, the phase-1 pin of the chip.

The input signal from op amp 31 is supplied to pin 14 of chip 55, and the vco output of the chip appears on pin 4 thereof. The vco output of chip 55 is supplied to divide-by-sixteen counter 43, which is implemented in FIG. 6A as a 4040-type CMOS chip. The 4040 chip is a twelve-stage ripple counter, and the implementation of FIG. 6A takes the divide-by-sixteen output of this chip (pin 5 of the chip) and supplies it back to pin 3 of the 4046 chip, the phase comparator input of that chip. The minimum and maximum frequencies of chip 55 are set by a 1M resistor R19 connected between pin 1 of chip 55 and ground and a 10K resistor R21 connected between pin 12 of chip 55 and ground.

When configured as described in connection with FIG. 6A, the output of phase locked loop has a phase with respect to the input of ninety degrees. Moreover, it has excellent noise immunity.

Figure 7:
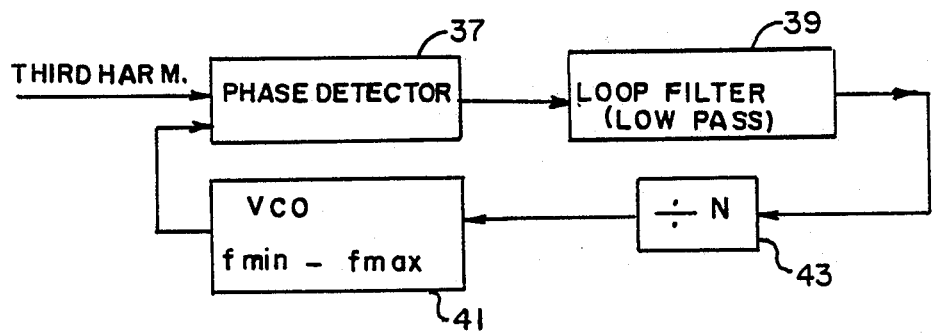
FIG. 7 is an electrical schematic illustrating the phase locked loop portion of the circuitry of FIG. 6.

The configuration of the phase locked loop is illustrated in FIG. 7. The signal from op amp 31, which signal includes the third harmonic, is supplied to phase detector 37. The output of the phase detector is supplied to the loop filter (a low-pass filter), whose output is then supplied to the divide-by-sixteen counter 43. The output of the counter 43 is supplied to the voltage controlled oscillator, whose output is supplied back to the phase detector to complete the loop.

Since for motor control we want good symmetry of pulses and good noise suppression, the bandwidth of loop filter 39 must be as narrow as possible. On the other hand, the bandwidth of the loop filter determines the window of frequencies onto which loop 35 can lock. The narrower the bandwidth of the loop filter, the narrower the window. In motor control, however, the speed varies over quite a range (e.g., over a range of 1:10) even if the motor is started from rest in the open loop manner described above, which would seem to require a fairly wide window.

These requirements can be accommodated by making the vco have a relatively low maximum frequency to minimum frequency ratio, but shifting the window defined by the minimum and maximum frequencies as the speed of the motor changes. The effect of this shifting is that the middle frequency of the vco is very near the third harmonic at all speeds, the frequency error is always low in the hunting regime and the phase locked loop can lock onto the third harmonic even with a loop filter having a narrow bandwidth.

Figure 8:
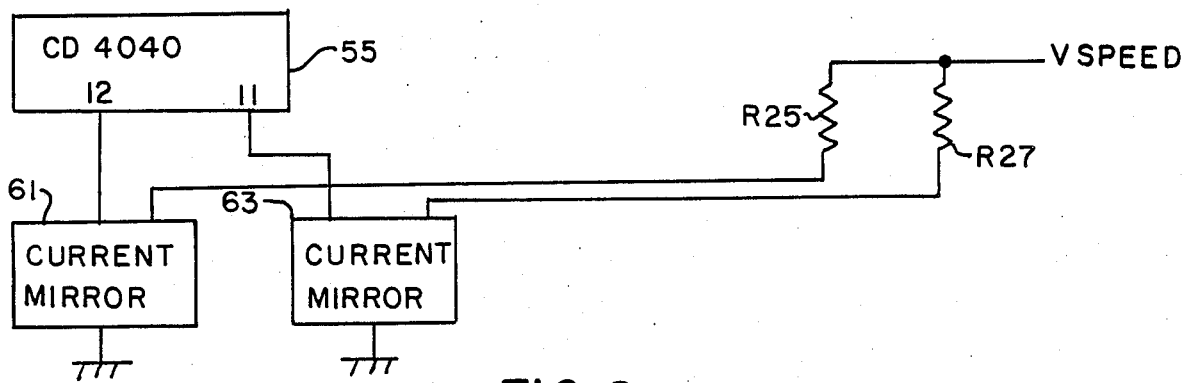
FIG. 8 is an electrical schematic showing an alternative embodiment of a portion of the circuitry of FIG. 6.

A circuit to accomplish this shifting scheme is illustrated in FIG. 8. In this circuit pin 12 of chip 55, the pin which defines the minimum frequency, is connected to a current mirror 61 which in turn is connected through a 1M resistor R25 to a signal $V_{SPEED}$ whose magnitude is proportional to the speed of the motor. This signal could vary from approximately two volts at 1000 rpm to approximately twelve volts at 6000 rpm for example.

In a similar fashion pin 11 of chip 55, the pin which governs the maximum frequency, is connected to a current mirror 63. Current mirror 63 is also connected by a 100K resistor R27 to the $V_{SPEED}$ signal. With this arrangement, the ratio of the maximum frequency to the minimum frequency remains compatible with the narrow bandwidth of loop filter 39 while the actual values of the maximum frequency and the minimum frequency increase as the speed of the motor increases.

In view of the above, it will be seen that the various objects and features of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. A system for determining rotor position information from the back EMF of a brushless permanent magnet motor, said motor having stator phase windings and a rotor for rotation with respect to said phase windings, said back EMF having at least a fundamental component and a third harmonic, comprising:

means for extracting the third harmonic from the back EMF of the permanent magnet motor;

means for detecting the phase angle of said third harmonic of the back EMF, said phase angle being a function of the position of the rotor; and means responsive to the phase angle detecting means for signaling the occurrence of a predetermined phase angle of the third harmonic;

wherein the motor has at least one stator phase winding per phase, said rotor having a plurality of permanent magnet poles so that rotation of the rotor generates a back EMF in the phase windings, said motor having motor terminals for each phase adapted to be connected to a power source;

said brushless permanent magnet motor being a multi-phase motor, said third harmonic extracting means including means connected to the motor terminals for all the phases for summing the voltages on the motor terminals and a phase locked loop, said third harmonic being extracted by said phase locked loop.

2. A system for determining rotor position information from the back EMF of a brushless permanent magnet motor, said motor having stator phase windings and a rotor for rotation with respect to said phase windings, said back EMF having at least a fundamental component and a third harmonic, comprising:

means for extracting the third harmonic from the back EMF of the permanent magnet motor, said extracting means including a phase locked loop, said third harmonic being extracted by said phase locked loop;

means for detecting the phase angle of said third harmonic of the back EMF, said phase angle being a function of the position of the rotor; and means responsive to the phase angle detecting means for signaling the occurrence of a predetermined phase angle of the third harmonic.

3. A commutation system for electronically commutating phase windings of a brushless permanent magnet motor, said motor having a rotor for rotation with respect to the phase windings, comprising:

means for sensing the back EMF of the motor, said back EMF having at least a fundamental component and a third harmonic, said back EMF being generated by rotation of the rotor with respect to the phase windings;

means for extracting the third harmonic from the back EMF of the motor, said extracting means including a phase locked loop, said third harmonic being extracted by said phase locked loop;

means for detecting the phase angle of the third harmonic of the back EMF, said phase angle being a function of the rotational position of the rotor;

switching means for selectively applying power to the phase windings of the motor, said switching means being responsive to a set of control signals; and means for generating the control signals in response to the detection of predetermined phase angles of the third harmonic by the phase angle detecting means.

4. The system as set forth in claim 3 further including means for providing a biasing signal to the phase locked loop to provide an advance angle for commutation.

5. The system as set forth in claim 3 including means for supplying a signal to the control signal generating means to override the phae locked loop during starting of the motor so that starting begins in an open loop mode, further including means for switching commutation from an open loop mode to a closed loop mode upon the occurrence of a predetermined condition.

6. The system as set forth in claim 3 wherein the control signal generating means includes a counter responsive to the phase locked loop.

7. The system as set forth in claim 3 wherein the motor is a multi-phase motor with terminals for each phase, said third harmonic extracting means further including means for summing the terminal voltages of the motor and supplying the summed voltage to the phase locked loop.

8. The system as set forth in claim 7 wherein the motor includes a neutral conductor, said phase angle detecting means including means for comparing the sum of the voltages on the motor terminals with the voltage on the neutral conductor.

9. A method of electronically commutating the phase windings of a brushless permanent magnet motor, said motor being a multi-phase motor with terminals for each phase, said motor having a back EMF generated by the rotation of a rotor with respect to the phase windings, comprising the steps of:

sensing the back EMF of the motor, said back EMF having at least a fundamental component and a third harmonic;

detecting the phase angle of the third harmonic of the back EMF, said phase angle being a function of the rotational position of the rotor, said detecting step including the step of summing the terminal voltages of the motor, said detecting step further including using a phase locked loop to condition the summed terminal voltage; and selectively applying power to the phase windings of the motor in response to the detection of predetermined phase angles of the third harmonic.

10. The method as set forth in claim 9 further including the step of supplying an advance angle signal to the phase locked loop to bias the output of the loop to provide a desired advance angle for commutation.

11. The method as set forth in claim 10 wherein the amount of advance angle is a function of the seed of rotation of the motor.

12. The method as set forth in claim 9 wherein the motor starts under open loop control.

13. The method as set forth in claim 12 wherein the motor is switched to closed loop control in which the phase locked loop conditions the summed terminal voltage upon the occurrence of a predetermined condition.

* * * * *

UNITED STATES PATENT AND TRADEMARK OFFICE
CERTIFICATE OF CORRECTION

PATENT NO. : 4,912,378
DATED : March 27, 1990
INVENTOR(S) : Vukosavic

It is certified that error appears in the above—identified patent and that said Letters Patent is hereby corrected as shown below:

Column 3, line 54 is "open house" should be -- open phase --

Column 5, line 17 is "maner" should be -- manner --

Column 5, line 21 is "suply" should be -- supply --

Column 5, line 68 is "terinals" should be -- terminals --

Column 8, line 5 is "pin 1" should be -- pin 11 --

Claim 5, column 10, line 12 is "phae" should be -- phase --

Claim 11, column 10, line 55 is "seed" should be --speed--

Signed and Sealed this

Thirty-first Day of December, 1991

Attest:

HARRY F. MANBECK, JR.

*Attesting Officer*     *Commissioner of Patents and Trademarks*